(12) United States Patent
Zemenchik et al.

(10) Patent No.: US 10,064,321 B2
(45) Date of Patent: Sep. 4, 2018

(54) AGRICULTURAL IMPLEMENT WITH PIVOTABLE SHANKS

(71) Applicant: CNH Industrial America LLC, New Holland, PA (US)

(72) Inventors: Robert A. Zemenchik, Kenosha, WI (US); Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 15/247,170

(22) Filed: Aug. 25, 2016

(65) Prior Publication Data
US 2018/0054952 A1    Mar. 1, 2018

(51) Int. Cl.
| | |
|---|---|
| *E01H 5/06* | (2006.01) |
| *E02F 3/76* | (2006.01) |
| *A01B 63/24* | (2006.01) |
| *A01B 73/04* | (2006.01) |
| *A01B 49/02* | (2006.01) |

(52) U.S. Cl.
CPC ............ *A01B 63/245* (2013.01); *A01B 49/02* (2013.01); *A01B 73/04* (2013.01)

(58) Field of Classification Search
CPC ........ A01B 63/245; A01B 49/02; A01B 73/04
See application file for complete search history.

(56) References Cited

U.S. PATENT DOCUMENTS

| | | |
|---|---|---|
| 3,782,481 A | 1/1974 | Quanbeck |
| 4,281,719 A | 8/1981 | Hake et al. |
| 4,738,316 A | 4/1988 | Wood |
| 5,042,589 A * | 8/1991 | Hundeby ............... A01B 63/22 172/310 |
| 5,641,026 A | 6/1997 | Balmer |
| 7,793,739 B2 | 9/2010 | Tiessen et al. |
| 8,381,827 B2 | 2/2013 | Gray et al. |
| 8,567,517 B2 | 10/2013 | Friggstad et al. |
| 9,253,937 B2 * | 2/2016 | Horsch ................ A01B 49/027 |

FOREIGN PATENT DOCUMENTS

EP            1731012 A1      12/2006

* cited by examiner

*Primary Examiner* — Tara Leigh Mayo-Pinnock
(74) *Attorney, Agent, or Firm* — Rebecca L. Henkel; Rickard K. DeMille

(57) ABSTRACT

An agricultural implement includes a chassis; a frame carried by the chassis; and a shank pivotably mounted to the frame which is pivotable about a pivot axis to switch between an operating position and a folding position, the shank pivoting at least 70° about the pivot axis to switch between the operating position and the folding position.

16 Claims, 7 Drawing Sheets

AGRICULTURAL IMPLEMENT WITH PIVOTABLE SHANKS

BACKGROUND OF THE INVENTION

1. Field of the Invention

The present invention relates to agricultural implements which incorporate shanks, and, more particularly, to field cultivators.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks which can carry various tools at their lower ends for tilling the soil such as shovels, sweeps, coulters, spikes, and plows. The field cultivator converts compacted soil into a level seedbed with a consistent depth for providing desirable conditions for planting crops. Grass or residual crop material disposed on top of the soil is also worked into the seedbed so that it does not interfere with a seeding implement subsequently passing through the seedbed.

Due to the large operating widths of many field cultivators, it is not possible to transport most cultivators in their operating width on public roads and comply with mandated public road travel regulations. To reduce the width of the cultivator for transport, many field cultivators have multiple sections, also called "wings," which fold upon one another to reduce the width of the cultivator. While folding the cultivator allows the width of the cultivator to be reduced from the operating width, increasingly large cultivators with multiple sections that fold on either side of the cultivator can still have a large width when folded. Since every vehicle on public roads needs to stay within specific width constraints to meet public road travel regulations, the folded width of a cultivator must stay within the specified width in order to travel on public roads. As the folded width of the cultivator is directly impacted by the operating width of the cultivator, which correlates with the number of folds that the cultivator goes through to assume the folded position, public road travel regulations also act to constrain the number of foldable sections of the cultivator and, ultimately, the operating width of the cultivator.

What is needed in the art is an agricultural implement which can have a decreased folded wing section width compared to known implements.

SUMMARY OF THE INVENTION

The present invention provides an agricultural implement with one or more shanks pivotably mounted to a frame which can pivot relative to the frame and reduce a folded width of the cultivator.

The invention in one form is directed to an agricultural implement including a chassis; a frame carried by the chassis; and a shank pivotably mounted to the frame which is pivotable about a pivot axis to switch between an operating position and a folding position, the shank pivoting at least 70° about the pivot axis to switch between the operating position and the folding position.

The invention in another form is directed to an agricultural implement including: a chassis; a frame carried by the chassis; a shank pivotably mounted to the frame and having a locking portion which includes a shank locking feature; and a locking mechanism carried by the chassis adjacent to the shank and having a shank coupling feature configured to couple with the shank locking feature. The locking mechanism is selectively actuatable between a coupling position where the shank coupling feature couples with an aligned shank locking feature and prevents the coupled shank from pivoting relative to the frame and a non-coupling position where the shank coupling feature cannot couple to an aligned shank locking feature which allows the shank to pivot relative to the frame.

The invention in another form is directed to an agricultural implement including: a chassis; a frame carried by the chassis; a plurality of shanks pivotably mounted to the frame and each having a locking portion which includes a shank locking feature; and a locking mechanism carried by the chassis adjacent to the shanks and having a plurality of shank coupling features each configured to couple with a respective one of the shank locking features. The locking mechanism is selectively actuatable between a coupling position where the shank coupling features couple with respectively aligned shank locking features and prevent the coupled shanks from pivoting relative to the frame and a non-coupling position where the shank coupling features cannot couple to aligned shank locking features which allows the shanks to pivot relative to the frame.

An advantage of the present invention is the shanks can pivot horizontally to reduce the space requirements for each folded section, reducing the overall width of each folded section.

Another advantage is reducing the overall width of each folded section allows for a greater number of folded sections to be included in the agricultural implement while meeting public road travel regulations and an increased operating width of the implement.

Yet another advantage is the shank can be locked in the folding position to keep the shank(s) from pivoting back to the operating position during transport.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
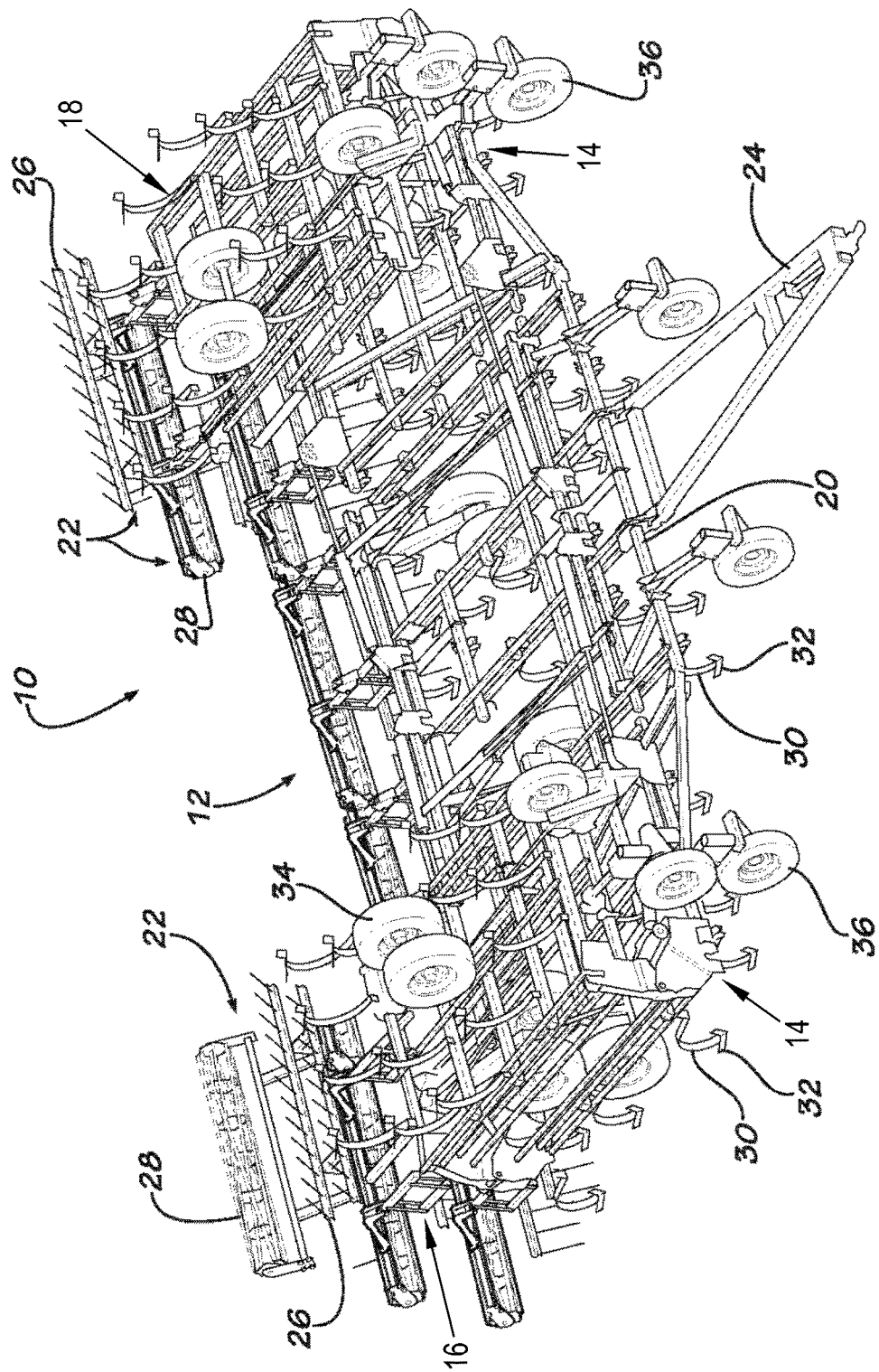
FIG. 1 is a perspective view of a partially folded agricultural implement formed according to the prior art.
Figure 2:
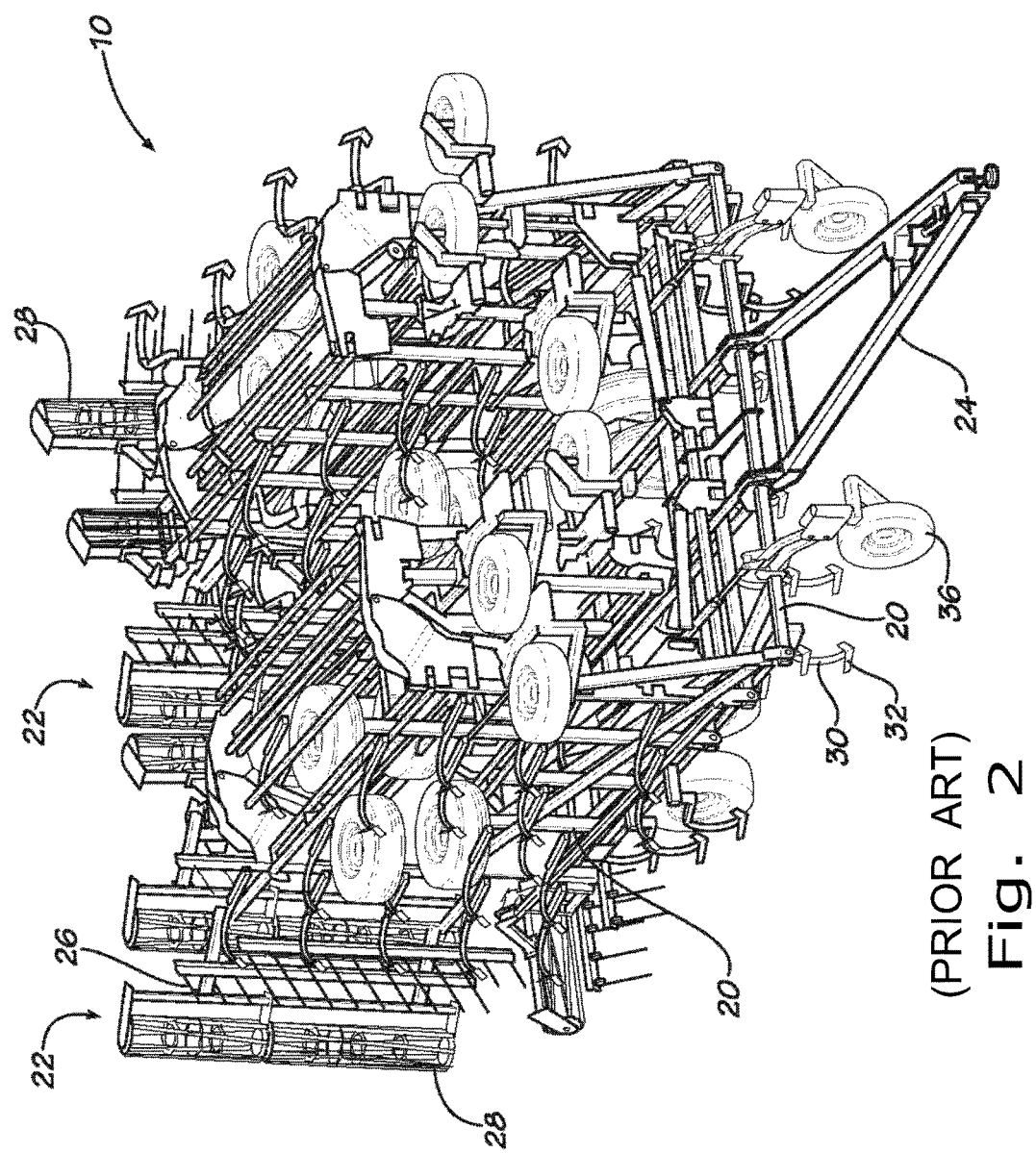
FIG. 2 is a perspective view of the agricultural implement shown in FIG. 1 fully folded.

Referring now to the drawings, and more particularly to FIGS. 1-2, perspective views of a known agricultural implement 10 are shown, with the agricultural implement 10 being a field cultivator which can be towed across a field by a tractor or other powered vehicle. Field cultivator 10 is configured as a multi-section field cultivator, and includes a center frame section 12 and a plurality of wing sections 14, 16, and 18. In the illustrated embodiment, field cultivator 10 has a triple-fold configuration with three left wings sections and three right wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20 of center frame section 12, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section, middle wing section, and outer wing section includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

As can be seen in FIG. 1, the wing sections 14, 16, 18 have been stacked on top of each other to reduce an overall width of the implement 10 and prepare for the implement 10 for transport on, for example, a public road. Stacking the wing sections 14, 16, 18 on top of one another reduces the overall width of the implement 10 to meet public road regulations. As can be seen, when the wing sections 14, 16, and 18 are stacked on top of each other, there must necessarily be some clearance between each stacked wing section 14, 16, 18 due to the shanks 30 extending toward the frames 20 and other shanks 30 of the stacked wing sections 14, 16, 18. This clearance must be maintained when the implement 10 folds into its final folded configuration, shown in FIG. 2, and contributes to the overall width of the implement 10 which must be below the value proscribed by public road regulations.

Figure 3:
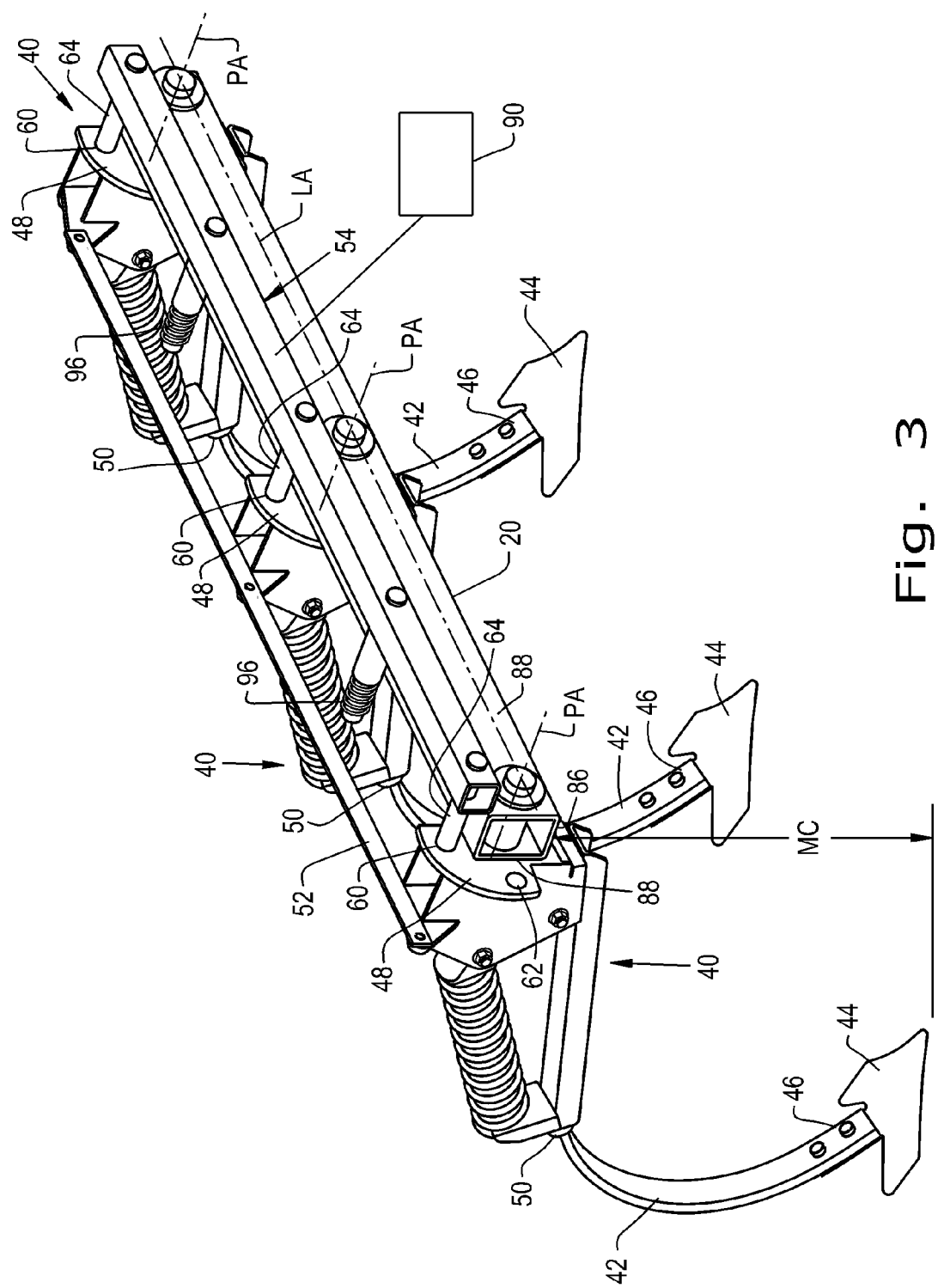
FIG. 3 is a perspective view of an embodiment of a pivotable shank assembly formed according to the present invention with shanks in an operating position and a locking mechanism in a coupling position.
Figure 4:
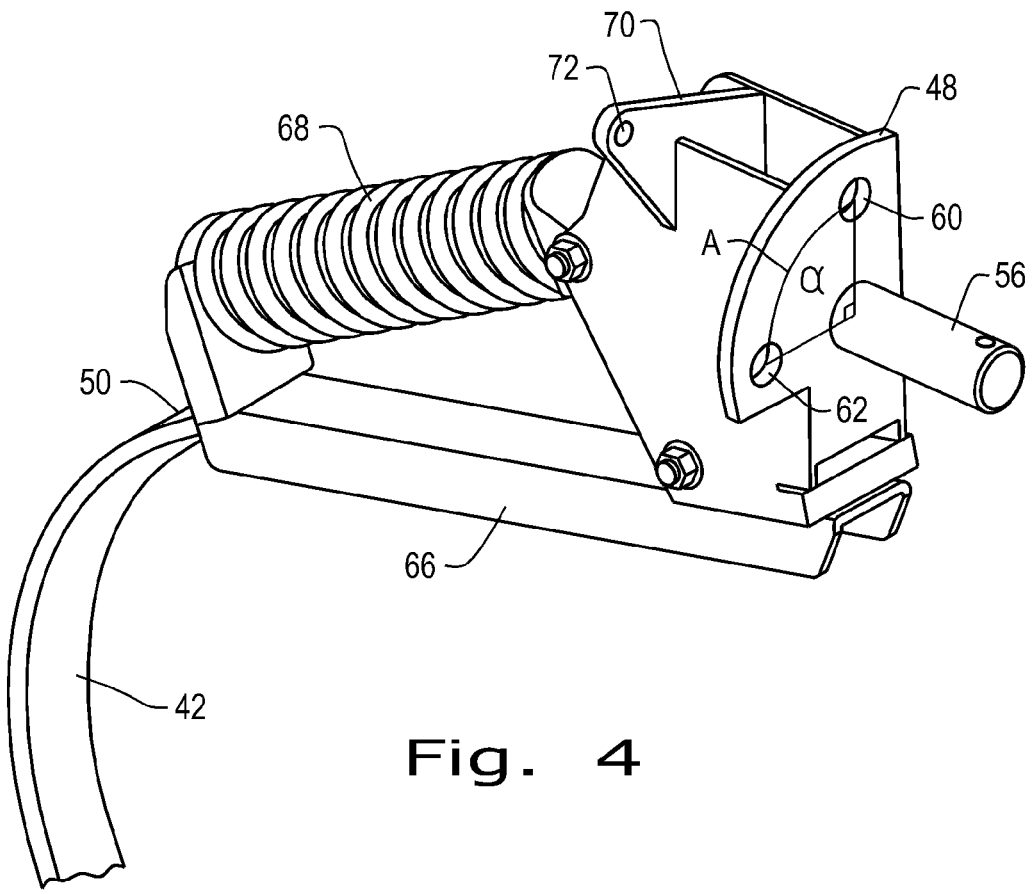
FIG. 4 is a perspective view of one of the shanks shown in FIG. 3.
Figure 5:
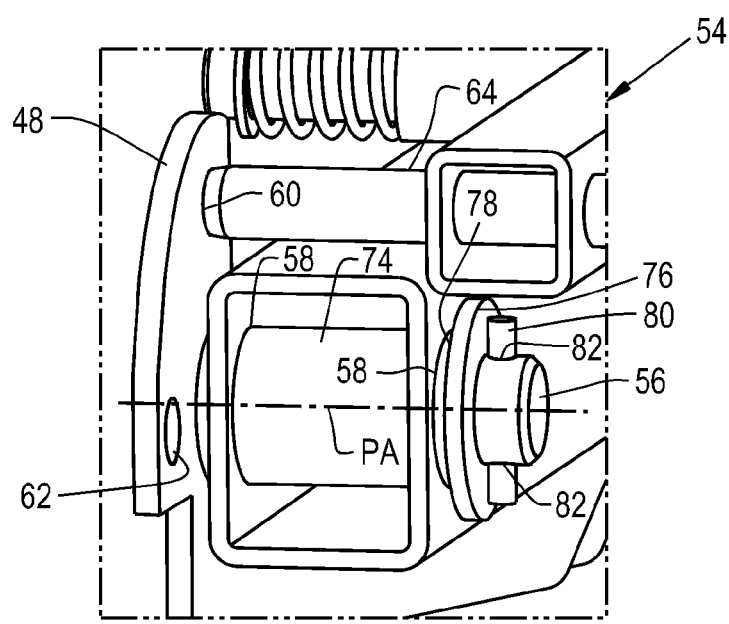
FIG. 5 is a perspective view of the shank shown in FIG. 4 pivotably mounted to a frame of the implement.

To reduce the transport width of the agricultural implement 10, and referring now to FIGS. 3-5, the agricultural implement 10 can include pivotable shank assemblies 40 mounted to the frames 20 of the wing sections 14, 16, 18. The pivotable shank assemblies 40 can each include a shank 42 with a tool 44, such as a shovel, attached at a distal end 46 of the shank 42 and a locking portion 48 attached to a proximal end 50 of the shank 42. The shank assemblies 40 can be optionally linked together by a pivot bar 52 attached to the locking portions 48 of the shank assemblies 40, the significance of which is described further herein. The implement 10 can also include a locking mechanism 54 that will lock the shank assemblies 40 into various positions, which is also described further herein.

Referring specifically now to FIG. 4, one of the locking portions 48 of the shank assemblies 40 is shown in greater detail. It should be appreciated that all of the locking portions 48 of the shank assemblies 40 are shown as being identical, but this is not necessary. The locking portion 48 can include a pivot peg 56 that interacts with one or more pivot openings 58 (shown in FIG. 5) formed in the frames 20 of the wing sections 14, 16, 18 to allow the shank assemblies 40 to pivot relative to the frames 20. Alternatively, the pivot peg 56 formed in the locking portion 48 can be replaced with a pivot opening and the pivot opening(s) 58 formed in the frames 20 can be replaced with a pivot peg. The locking portion 48 can also include one or more shank locking features, shown as a first shank locking opening 60 and a second shank locking opening 62, which can couple with a shank coupling feature 64 (shown in FIGS. 3 and 5-8) of the locking mechanism 54 to prevent the shanks 42 from pivoting, which is described further herein. It should be appreciated that while the shank locking features 60 and 62 are shown as openings and the shank coupling feature 64 is shown as a pin that inserts into the openings 60 and 62, the shank locking features 60 and 62 and the shank coupling feature 64 can be configured as other types of features that couple together, so long as the shank coupling feature 64 can reversibly couple with one or both of the shank locking features 60, 62 to prevent the shanks 42 from pivoting. The locking portion 48 can be connected to the proximal end 50 of the shank 42 by a rigid mounting bar 66 as well as a spring 68 that allows some flexure of the shank 42 as the agricultural implement 10 travels across a field. Each locking portion 48 can also include a linking tab 70 with a linking opening 72 that connects to the pivot bar 52, linking pivoting of each locking portion 48 together via connection to the pivot bar 52.

Referring now to FIG. 5, a close-up view of the locking portion 48 connected to the frame 20 is shown. As can be seen, the pivot peg 56 of the locking portion 48 is placed within the pivot openings 58 of the frame 20. As the pivot peg 56 will be pivoting within the pivot openings 58, the pivot peg 56 can be placed within a bearing sleeve 74 to reduce wear of the pivot peg 56 and allow for use of larger diameter pivot openings. A washer 76 can be placed between an end 78 of the bearing sleeve 74 and a securing pin 80 placed through pin openings 82 formed in the pivot peg 56 to secure the pivot peg 56 in the pivot openings 58 while still allowing pivoting of the locking portion 48. As can be seen, the shank coupling feature 64 of the locking mechanism 54 has been placed in the first shank locking opening 60 to prevent pivoting of the shank 42 about a pivot axis PA defined by the pivot peg 56 held within the pivot openings

58. While it cannot be seen in FIG. 5, the shank coupling feature 64 can have a tapered end 84 (shown in FIG. 6) that is inserted within the shank locking openings 60 and 62 to prevent pivoting of the shank 42 about the pivot axis PA.

Referring now to FIGS. 3 and 6-8, it is illustrated how the pivoting shank assemblies 40 of the present invention can reduce the clearance needed between stacked wing sections 14, 16, 18 and reduce the folded width of the agricultural implement 10. As shown in FIG. 3, the pivoting shank assemblies 40 are in an operating position where a bottom of the shanks 42, which can be the shovels 44, define a maximum clearance MC relative to a bottom surface 86 of the frame 20. By having the maximum clearance MC between the shovels 44 of the shanks 42 and the bottom surface 86 of the frame 20 in the operating position, the shovels 44 are able to engage the ground during operation and till the soil as the implement 10 travels across the field. As can be seen, the pivot axis PA, which the shanks 42 pivot about, does not extend through the bottom surface 86, but rather two surfaces 88 which extend perpendicularly to the bottom surface 86 of the frame. Further, the frame 20 can define a longitudinal axis LA therethrough, with the pivot axis PA being transverse to the longitudinal axis LA. In the embodiment shown herein, the pivot axis PA is orthogonal to the longitudinal axis LA, but such a geometric relationship is not required. Also shown in FIG. 3 is the locking mechanism 54 in the coupling position so the shank coupling feature 64 is coupled with the first shank locking opening 60 to prevent pivoting of the locking portion 48, and thus the shank 42, about the pivot axis PA.

Referring back to FIG. 6, it can be seen that the locking mechanism 54 has been actuated away from the locking portions 48 of the shank assemblies 40 to a non-coupling position so the locking portions 48 can be freely pivoted about the pivot axis PA. The locking mechanism 54 can be selectively actuated to the non-coupling position by an actuator 90 linked to the locking mechanism 54, with the actuator 90 selectively actuating the locking mechanism 54 in a direction 92 that is parallel to the pivot axis PA. The actuator 90 is represented as a rectangular shape to signify that the actuator 90 can be any type of construction suitable for actuating the locking mechanism 54, such as a pneumatic or hydraulic cylinder or an electrically powered actuator. Thus, in the non-coupling position shown in FIG. 6, the shank coupling features 64 of the locking mechanism 54 are still aligned with the first shank locking openings 60 of the locking portions 48 and can be actuated back to the coupling position (toward the locking portions 48) to couple with the first shank locking openings 60 and prevent pivotal movement of the locking portions 48 and connected shanks 42.

Figure 7:
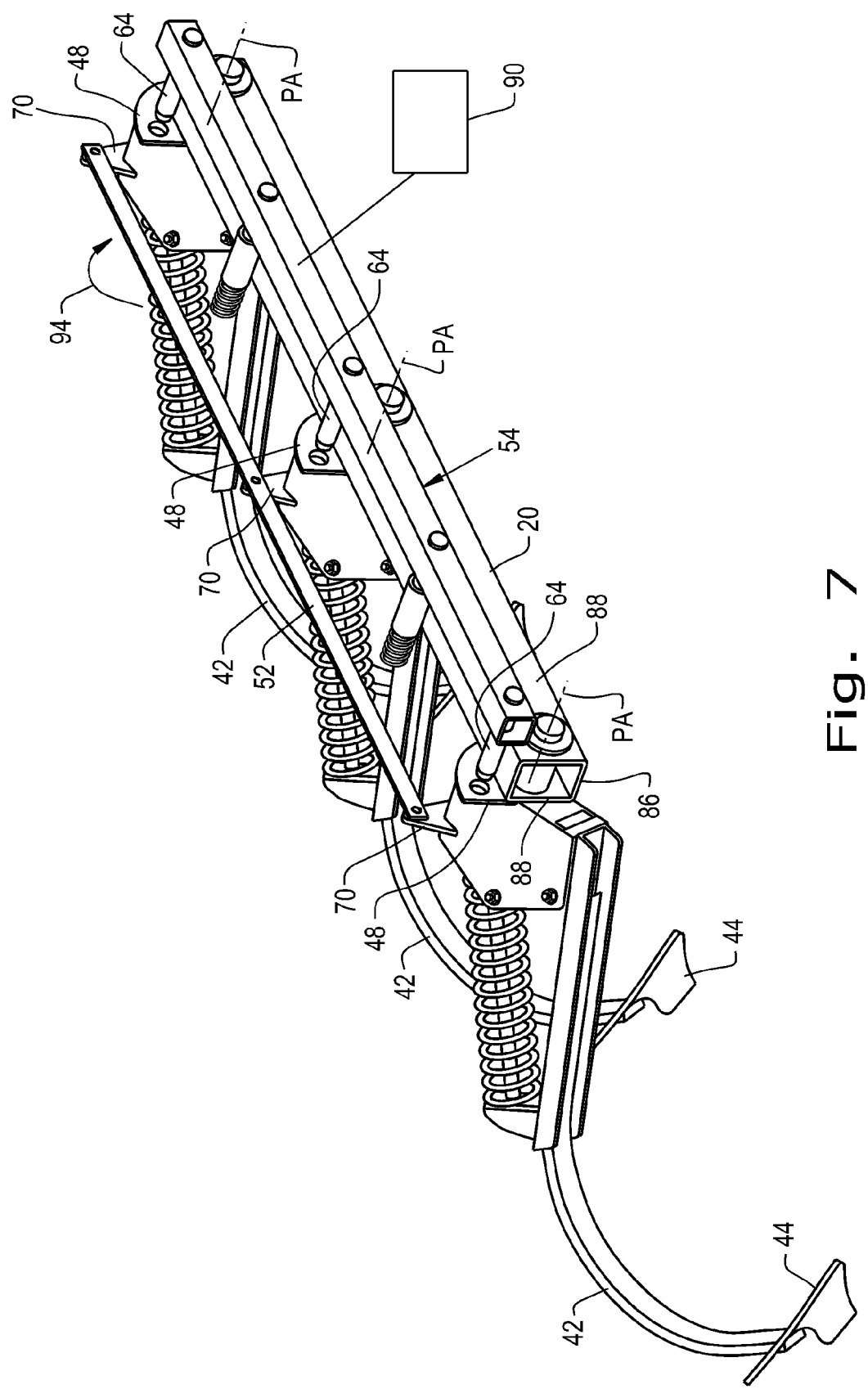
FIG. 7 is a perspective view of the pivotable shank assembly shown in FIGS. 3 and 6 with the shanks pivoted from the operating position toward a folding position.

Referring now to FIG. 7, the locking portions 48 and connected shanks 42 have been pivoted about the pivot axis PA to reduce the clearance between the shovels 44 and the bottom surface 86 of the frame 20. To pivot the shanks 42, the pivot bar 52 can be pivoted in a clockwise direction 94 relative to the pivot axis PA to cause pivoting of the connected locking portions 48 and shanks 42. It should be appreciated that the clockwise direction 94 referenced herein is for ease of description in reference to FIG. 7, and is not intended to limit pivoting of the shanks 42 to any one particular direction. As the clearance between the bottom surface 86 of the frame 20 and the shovels 44 of the shanks 42 has decreased, so too will the clearance necessary to stack the wing sections 14, 16, 18 on each other. However, as can be seen, the shovels 44 of the shanks 42 are still significantly below the bottom surface 86 of the frame 20 and therefore require more clearance than might be desired, resulting in a greater than desired width of the implement 10 when folded.

Figure 6:
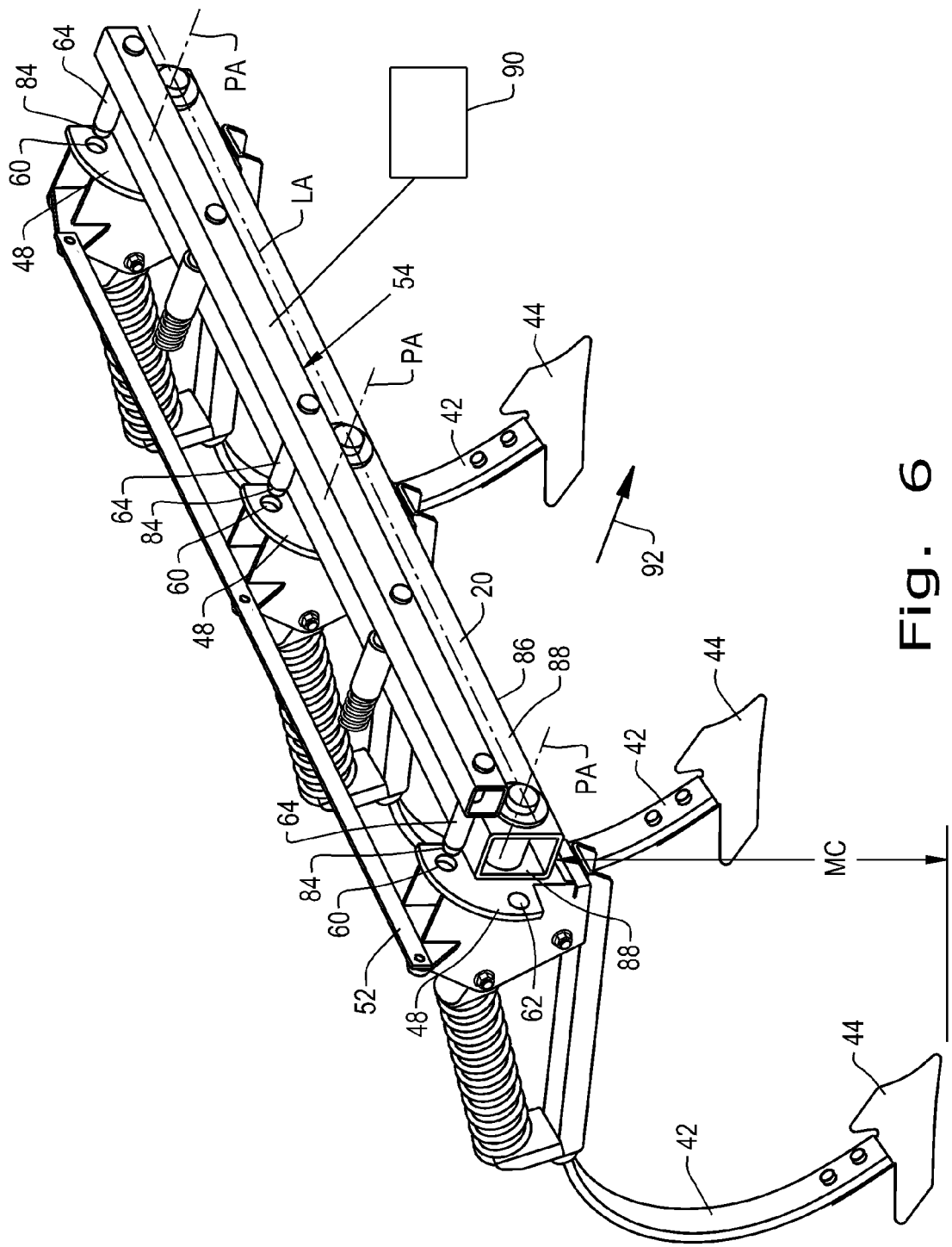
FIG. 6 is a perspective view of the pivotable shank assembly shown in FIG. 3 with the locking mechanism in a non-coupling position.
Figure 8:
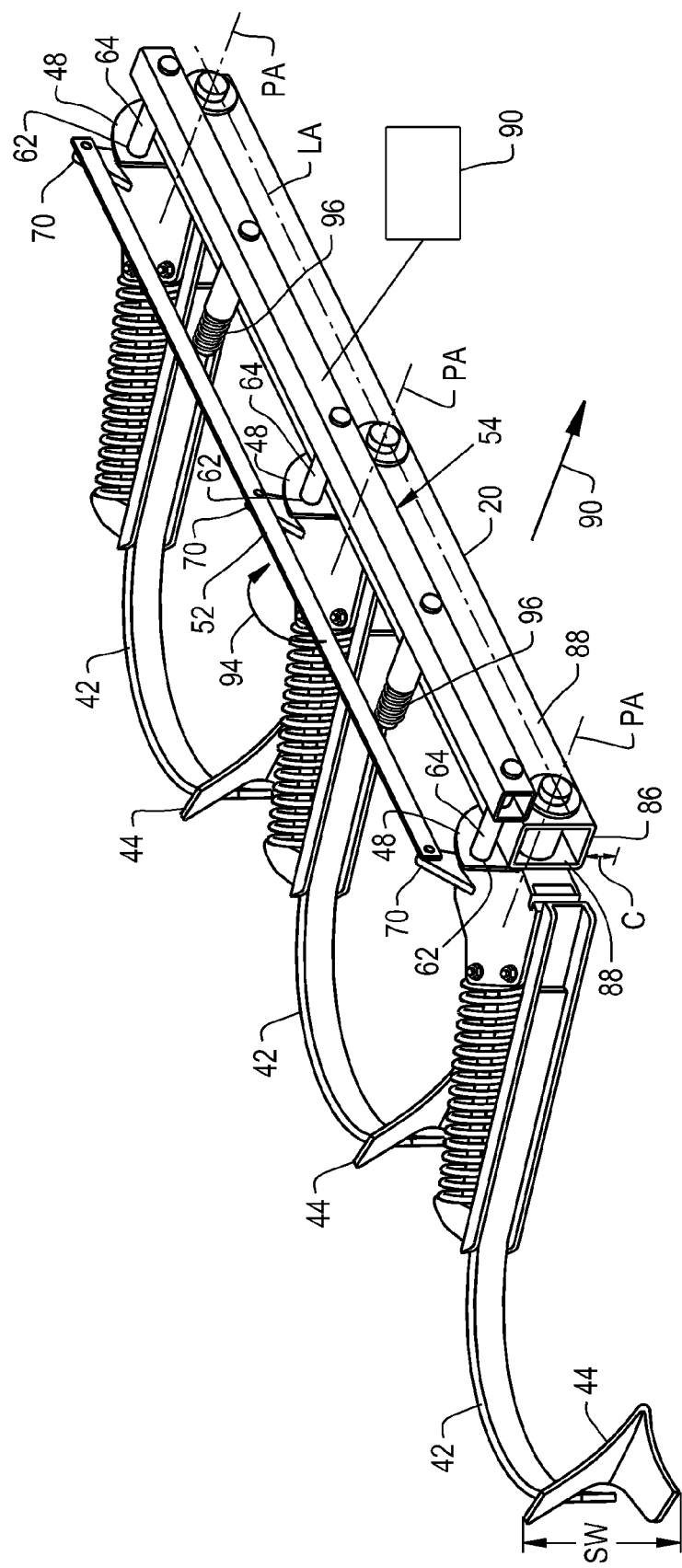
FIG. 8 is a perspective view of the pivotable shank assembly shown in FIGS. 3 and 6-7 with the shanks in the folding position and the locking mechanism returned to the coupling position.

Referring now to FIG. 8, the shanks 42 are shown in a folding position where the locking portions 48 have been pivoted 90° about the pivot axis PA, relative to the operating position shown in FIGS. 3 and 6, so the shovels 44 of the shanks 42 and the bottom surface 86 of the frame 20 define a minimum clearance C. Since the shanks 42 have pivoted 90° about the pivot axis PA which is orthogonal to the longitudinal axis LA of the frame 20, the shovels 44 of the shanks 42 are held horizontally relative to the frame 20 when the frame 20 is in an unfolded position. By pivoting the shanks 42 to the folding position, the clearance between the shovels 44 of the shanks 42 and the bottom surface 86 of the frame 20 is no longer the largest vertically protruding dimension of the pivoting shank assemblies 40. Rather, a shovel width SW of the shovels 44, which is significantly less than a linear length of the shanks 42, can be the largest vertically protruding dimension, and thus reduce the clearance needed to fold the wing sections 14, 16, 18 on top of each other. Thus, by pivoting the shanks 42 relative to the frame 20 about the pivot axis PA, the necessary clearance to fold the wing sections 14, 16, 18 can be reduced, resulting in a smaller width of the implement 10 in the folded configuration. While the shanks 42 are shown as pivoting 90° between the operating position and folding position, it is contemplated that the shanks 42 can pivot less than 90°, such as 70°, between the operating position and folding position to reduce the folded width of the implement 10. However, in the shown configuration, pivoting the shanks 90° will minimize the clearance between the shovels 44 of the shanks 42 and the bottom surface 86 of the frame 20.

As can be further seen in FIG. 8, the locking mechanism 54 has been returned to the coupling position so the shank coupling features 64 are inserted in aligned second shank locking openings 62 of the locking portions 48 to prevent pivoting of the shanks 42 about the pivot axis PA. The locking mechanism 54 can be returned to the coupling position actively by the actuator 90, or passively by return springs 96 that are coupled to the locking mechanism 54 and pull on the locking mechanism 54 opposite to the direction 90. Optionally, the return springs 96 can be compression springs that will push the locking mechanism 54 opposite to the direction 90, in which case the return springs 96 would be on the opposite side of the locking mechanism 54, compared to what is shown in FIG. 8. Once the shank coupling features 64 are placed in the coupling position and couple with the aligned second shank locking openings 62 of the locking portions 48, the shanks 42 cannot be pivoted about the pivot axis PA until the shank coupling features 64 are returned to the non-coupling position, preventing the shanks 42 from inadvertently pivoting about the pivot axis PA during folding of the wing sections 14, 16, 18 or travel of the implement 10. When the shank coupling features 64 may only travel linearly between the coupling and non-coupling positions, as shown, the first shank locking openings 60 and second shank locking openings 62 can define an arc A (shown in FIG. 4) therebetween relative to the pivot peg 56 on the locking portion 48, which defines the pivot axis PA. The arc A can have an arc length α which is between, for example, 70° and 90°, corresponding to the angle that the shanks 42 pivot between the operating position and the folding position. By separating the shank locking openings 60 and 62 by an arc A with an arc length a corresponding to the pivot angle of the shanks 42 between the operating and folding positions, the shank locking feature 64 only needs to move linearly to couple with the shank locking openings 60 and 62 as the locking portion 48 pivots, providing a relatively simple mechanism to selectively prevent and allow the shanks 42 to pivot about the pivot axis PA.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
a chassis;
a frame carried by said chassis;
a shank pivotably mounted to said frame and having a locking portion which includes a shank locking feature; and
a locking mechanism carried by said chassis adjacent to said shank and having a shank coupling feature configured to couple with said shank locking feature, said locking mechanism being selectively actuatable between a coupling position where said shank coupling feature couples with an aligned shank locking feature and prevents said coupled shank from pivoting relative to said frame and a non-coupling position where said shank coupling feature cannot couple to an aligned shank locking feature which allows said shank to pivot relative to said frame.

2. The agricultural implement according to claim 1, wherein said frame defines a longitudinal axis and said shank is pivotable relative to said frame about a pivot axis which is transverse to said longitudinal axis.

3. The agricultural implement according to claim 2, wherein said locking mechanism is selectively actuatable parallel to said pivot axis between said coupling position and said non-coupling position.

4. The agricultural implement according to claim 1, further comprising an actuator linked to said locking mechanism, said actuator being configured to selectively actuate said locking mechanism between said coupling position and said non-coupling position.

5. The agricultural implement according to claim 1, wherein said locking portion of said shank includes a second shank locking feature configured to couple with said shank coupling feature of said locking mechanism, said shank coupling feature preventing said shank from pivoting relative to said frame when coupled with said second shank locking feature.

6. The agricultural implement according to claim 5, wherein said shank coupling feature of said locking mechanism can couple with said second shank locking feature in said coupling position when said second shank locking feature is aligned with said shank coupling feature.

7. The agricultural implement according to claim 5, wherein said shank pivots relative to said frame about a pivot axis, said shank locking feature and said second shank locking feature defining an arc therebetween about said pivot axis.

8. The agricultural implement according to claim 7, wherein said arc has an arc length of 70° to 90°.

9. An agricultural implement, comprising:
a chassis;
a frame carried by said chassis;
a plurality of shanks pivotably mounted to said frame and each having a locking portion which includes a shank locking feature; and
a locking mechanism carried by said chassis adjacent to said shanks and having a plurality of shank coupling features each configured to couple with a respective one of said shank locking features, said locking mechanism being selectively actuatable between a coupling position where said shank coupling features couple with respectively aligned shank locking features and prevent coupled shanks from pivoting relative to said frame and a non-coupling position where said shank coupling features cannot couple to aligned shank locking features which allows said shanks to pivot relative to said frame.

10. The agricultural implement according to claim 6, wherein said frame defines a longitudinal axis and each of said shanks are pivotable relative to said frame about a respective pivot axis which is transverse to said longitudinal axis.

11. The agricultural implement according to claim 10, wherein said locking mechanism is selectively actuatable parallel to said pivot axes between said coupling position and said non-coupling position.

12. The agricultural implement according to claim 9, further comprising an actuator linked to said locking mechanism, said actuator being configured to selectively actuate said locking mechanism between said coupling position and said non-coupling position.

13. The agricultural implement according to claim 9, wherein said locking portions of said shanks each include a second shank locking feature configured to couple with a respective shank coupling feature of said locking mechanism, said shank coupling features preventing said shanks from pivoting relative to said frame when coupled with said second shank locking features.

14. The agricultural implement according to claim 13, wherein said shank coupling features of said locking mechanism can couple with said second shank locking features in said coupling position when said second shank locking features are aligned with said shank coupling features.

15. The agricultural implement according to claim 13, wherein each of said shanks pivots relative to said frame about a respective pivot axis, said shank locking feature and said second shank locking feature of each locking portion defining an arc therebetween about said respective pivot axis.

16. The agricultural implement according to claim 15, wherein each said arc has an arc length of 70° to 90°.

* * * * *